UNITED STATES PATENT OFFICE.

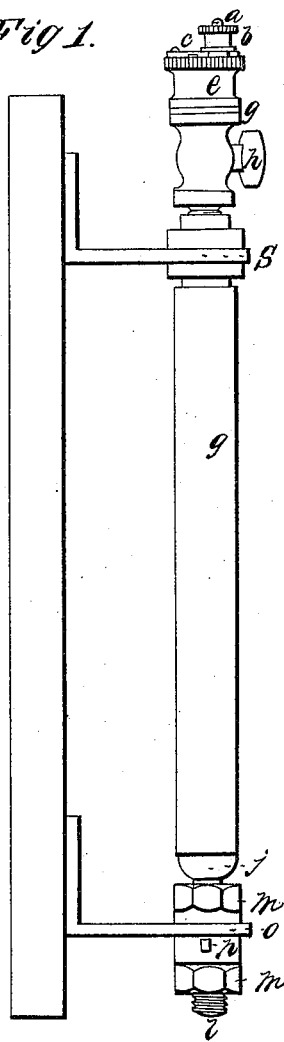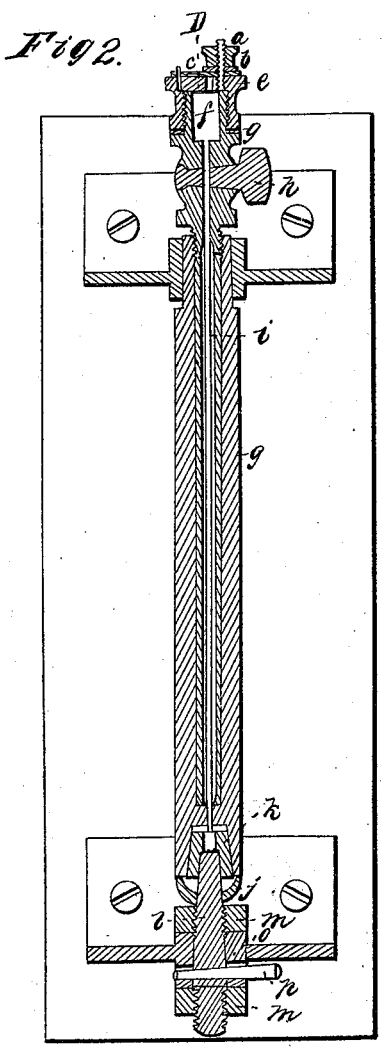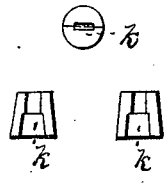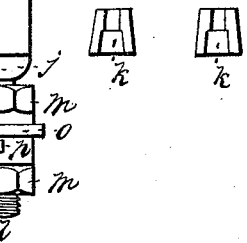

JOHN F. SCHUFFENECKER, OF ST. LOUIS, MISSOURI.

IMPROVEMENT IN LUBRICATING VERTICAL SHAFTS.

Specification forming part of Letters Patent No. 52,454, dated February 6, 1866.

*To all whom it may concern:*

Be it known that I, JOHN F. SCHUFFENECKER, of St. Louis, in the county of St. Louis, State of Missouri, have invented a new and useful Improvement in Shafts; and I do hereby declare that the following is a full and exact description thereof, reference being had to the accompanying drawings, and to the letters of reference marked thereon, in which—

Figure 1 is a side view. Fig. 2 is a central vertical section. Fig. 3 is a top view of lubricator. Fig. 4 are plans.

In the drawings, Figs. 2, 3, and 4, $g$ is a packing, which is put against the shoulder of the lubricator A. A cap, $e$, is screwed to the same, and presses the said packing against the shoulder in order to make the inside of the lubricator perfectly air-tight. To allow the necessary air which is required to pass the oil to the pan and toe a hole is made through the face of the cap above the reservoir $f$. A pin is secured into the cap on which the left end of the shutter C is turning. A slot which is made into the right end of the shutter is for the purpose to regulate the necessary air. The said shutter is partially fitted close to the face of the cap. (See Fig. 3.)

$a$ is a screw, which is secured into the cap and passes through the slot of said shutter. $b$ is a nut at the said screw, and serves to secure the shutter after it is set. $h$ is a cock. $s$ is a collar. $i$ is a tube secured to the lower part of the lubricator. $g$ is the shaft. $k$ is the pan, which is fitted into the lower part of said shaft, so that a certain space is left between the top of the pan and the bottom of the inside of the shaft. (See Fig. 2.)

The construction of the pan in two halves is for the purpose to cut a groove into each part, and when put together it will show a small slot, $r$, which varies in breadth according to the diameter of the toe. The said slot will not extend over the whole surface of the toe. (See Fig. 4.)

$l$ is a toe which passes through the foundation-plate O. $m\ m$ are nuts to the same. $p$ is a key which passes through the foundation-plate and toe. The oil which flows down the toe passes through an opening in the cup $j$. The upper surface of said cup strikes against the lower end of the shaft in order to keep unfit materials away from the pan.

The intention to construct and arrange the pan and toe as above described is for the purpose to avoid the speedy wear of the pan and toe which is caused by unfit materials, which may reach the pan either by a pressure or otherwise, as it is the case by the general construction of the vertical shafts. The shaft loses its level by the wear of the pan and toe; but it is raised to its former level again by unscrewing the nut beneath the foundation-plate. Unscrew the nut above until the shaft is high enough and drive the key in as far as possible, in order that the nut $m$ does not bear the whole weight of the shaft; unscrew the nut beneath again. This nut serves to hold the toe in its proper position.

The pan and toe are oiled from above by a lubricator, and it is used in the following manner: Before running turn the gripe of the cock in a horizontal position, push the shutter toward the screw, and fill the reservoir by the hole in the cap; move the shutter forward and allow the necessary air which is required by setting the shutter as above described, and turn the gripe of the cock again in a vertical position.

What I claim as new, and wish to secure by Letters Patent, is—

1. An upright permanent toe, $l$, nuts $m\ m$, key $p$, and the pan $k$, with the oil hole or slot $r$ and cup $j$, as shown, and for the purpose herein described.

2. Oiling the pan and toe from above by the lubricator A, tube $i$, with the vent-hole $d$, shutter C, secured by the screw $a$ and nut $b$, or its equivalent.

JOHN F. SCHUFFENECKER.

Witnesses:
J. M. BAUER,
JOHN FAESSLER.